United States Patent Office 3,778,301
Patented Dec. 11, 1973

3,778,301
METHOD OF COATING GRAPHITE TUBES WITH REFRACTORY METAL CARBIDES
Cornel Wohlberg, Jeanette, Pa., assignor to the United States of America as represented by the United States Atomic Energy Commission
No Drawing. Filed Apr. 28, 1967, Ser. No. 636,573
Int. Cl. C23f 11/00
U.S. Cl. 117—118    3 Claims

ABSTRACT OF THE DISCLOSURE

A method of coating graphite tubes with a refractory metal carbide and in which an alkali halide is reacted with a metallic oxide, said metallic portion being selected from the IVth or Vth group of the Periodic Table, the resulting salt reacting in turn with the carbon to give the desired refractory metal carbide coating.

---

The invention described herein was made in the course of, or under a contract with the U.S. Atomic Energy Commission.

The inventor has observed that when niobium oxide is used as a basis of a coating on a graphite tube the oxide usually undergoes several transitions before the graphite coating is formed. First, there is melting and the formation of a nonwetting "glob." Then there is a bubbling or gas evolution, probably with solution of carbon, and finally, spreading. The nonwetting globs of oxide are shot out of the tube by gases evolved in the tube during heating with the result that the coating on the walls of the tube is not complete. The invention described here involves the formation of a melt that wets the graphite immediately and results in the formation of a homogeneous adherent graphite coat. The method of this invention has the further advantage that the reactions can take place at relatively low temperatures with apparently good "throwing power," which helps in the formation of a uniform and complete coat. The importance of having a good coating on a graphite channel or the interior portion of a graphite tube is to prevent corrosion when such a tube is used as a channel for a propellant such as hydrogen. Such a use would find application in various nuclear reactors which have been designed to date.

The essential feature of this process over the prior art is the addition of an alkali halide to the IVth or Vth group on the Periodic Table of metals, said metals being present as a metallic oxide compound. The alkali halide forms a salt with the refractory metal and this in turn reacts with the carbon to give the carbon to give the desired refractory carbide coating.

It is therefore an object of this invention to provide a method of coating graphite tubes with refractory metal carbide coating, and more particularly, coating the inside diameters of said tubes.

Other objects of this invention will be apparent from the following described preferred embodiment.

The following is a typical reaction using $Nb_2O_5$ as the carbide former:

$$Nb_2O_5 + 10MX + 5C \rightarrow 2NbX_5 + 5CO + 10M$$

where M is an alkali metal and X represents a halogen atom. The subsequent reactions are represented by the following overall reaction:

$$NbX_5 + C \rightarrow NbC + 2.5X_2$$

The halogen is evolved as a gas.

In a typical application a paint or slip is prepared by grinding together LiF and $Nb_2O_5$ in a 1:1 mole ratio in methanol. The mix is thixotropic, so that no other suspending agent is required. The paint is sucked into the tube or painted on an outside surface. After air drying, the sample is slowly (an inch per one or two minutes) fed through a graphite tube furnace preheated to preferably 2000°–2200° C. in a helium or argon atmosphere.

The coatings are adherent and uniform and are used as the basis for a second coat based on $Nb_2O_5$. Uranium carbide containing graphites are readily coated.

It should be understood that the method is applicable to different types of carbon materials for coating purposes and that it is even suitable for incorporating NbC uniformly into carbon bodies formed from powdered mixtures. For instance, one of the oxides of vanadium and LiF could be incorporated into a carbon mixture, pressed, and fired to give a coherent body.

The ratio of refractory metal oxide to alkali halide is varied from 1:1 to 1:0.25. Although the lithium fluoride seems to be the most effective, other alkali halides can be similarly used.

Although the preferred embodiment describes only a niobium oxide, any refractory metal oxide from the IVth or Vth group of the Periodic Table can be substituted therefor, and it is to be understood that the invention is to be limited only by the scope of the following claims.

What is claimed is:

1. A method of coating graphite with a refractory carbide consisting of adding an alkali halide to a refractory metallic oxide, said metallic portion being selected from the IVth or Vth groups of the Periodic Table, grinding the said oxide with the halide in a 1:1 to 1:0.25 mole ratio in a slip of methanol, applying the resulting mixture on a graphite surface and then heating to a temperature of about 2000° C. in an inert atmosphere.

2. The method of claim 1 in which the refractory metal oxide is niobium oxide and the alkali halide is lithium fluoride.

3. The method of claim 1 in which the mole ratio of the said oxide to halide is 1:1.

References Cited
UNITED STATES PATENTS

| | | | |
|---|---|---|---|
| 3,031,342 | 4/1962 | Kertesz et al. | 117—228 X |
| 3,191,852 | 6/1965 | Kaatz et al. | 117—228 X |
| 3,208,870 | 9/1965 | Criss | 117—169 X |
| 3,208,872 | 9/1965 | Criss et al. | 117—169 X |
| 3,230,278 | 1/1966 | Bauschmann | 264—.5 |
| 3,322,512 | 5/1967 | Krock et al. | 29—182 |

HARVEY E. BEHREND, Primary Examiner

U.S. Cl. X.R.
117—169